US009733677B2

United States Patent
Geva (10) Patent No.: US 9,733,677 B2
(45) Date of Patent: Aug. 15, 2017

(54) MOTION-BASED MESSAGE DISPLAY (71) Applicant: Ran Geva, Tel Aviv (IL)

(72) Inventor: Ran Geva, Tel Aviv (IL)

(*) Notice: Subject to any disclaimer, the term of this patent is extended or adjusted under 35 U.S.C. 154(b) by 0 days.

(21) Appl. No.: 14/889,411

(22) PCT Filed: May 4, 2014

(86) PCT No.: PCT/IL2014/050400
§ 371 (c)(1),
(2) Date: Nov. 5, 2015

(87) PCT Pub. No.: WO2014/181326
PCT Pub. Date: Nov. 13, 2014

(65) Prior Publication Data
US 2016/0070311 A1  Mar. 10, 2016

Related U.S. Application Data (60) Provisional application No. 61/820,732, filed on May 8, 2013.

(51) Int. Cl.
G06F 1/16 (2006.01)
G06Q 30/02 (2012.01)
G09G 5/10 (2006.01)

(52) U.S. Cl.
CPC ....... G06F 1/1694 (2013.01); G06Q 30/0241 (2013.01); G09G 5/10 (2013.01);
(Continued)

(58) Field of Classification Search
CPC .......... G06F 1/1694; G06F 2200/1637; G06F 2203/04804; G06T 2210/62
See application file for complete search history.

(56) References Cited

U.S. PATENT DOCUMENTS 9,075,451 B2 * 7/2015 Gardenfors ............... G06F 3/03
2006/0004630 A1 1/2006 Criddle et al.
2011/0037778 A1 2/2011 Deng

FOREIGN PATENT DOCUMENTS

EP  1912109 A1  4/2008
WO  2005055568 A1  6/2005

OTHER PUBLICATIONS

International Search Report and Written Opinion of ISA for PCT/IL2014/050400 (Sep. 4, 2014).

* cited by examiner

Primary Examiner — Antonio A Caschera
(74) Attorney, Agent, or Firm — Koffsky Schwalb LLP; Mark I. Koffsky

(57) ABSTRACT

Computer-implemented methods, apparatus, and computer program product, the method comprising: receiving a reading from a sensor associated with a mobile computing device used by a user; determining based on the reading whether the device is in movement exceeding a threshold; responsive to the movement exceeding the threshold, displaying a message in a first manner; and responsive to the movement not exceeding the threshold, displaying the message in a second manner. The first manner may be associated with the message obstructing content displayed on the device; and the second manner may be associated with content displayed on the device being obstructed less than when the movement exceeds the threshold. The first manner may be associated with the message being bolder and the second manner may be associated with message being less bolder than when the movement exceeds the threshold.

31 Claims, 6 Drawing Sheets (52) U.S. Cl.
CPC ............... *G06F 2200/1637* (2013.01); *G06F 2203/04804* (2013.01)

MOTION-BASED MESSAGE DISPLAY

CROSS-REFERENCE TO RELATED APPLICATIONS

This application claims the benefit of U.S. provisional Application No. 61/820,732 filed May 8, 2013, which is hereby incorporated by reference in its entirety.

TECHNICAL FIELD

The present disclosure relates to mobile devices in general, and to a method and apparatus for displaying messages to users of mobile devices or changing message appearance, in particular.

BACKGROUND

In recent years, electronic technology, including communication technology, has revolutionized our everyday lives. Electronic communication devices such as mobile phones, tablet computers or others have permeated the lives of almost every person living in the developed world, and quite a number of people living in undeveloped countries. Mobile communication and computing devices, especially, have become the means by which countless millions consume and share information and communicate in various forms such as e-mail, text messages and in particular surfing the Internet and using web-based applications.

In order to finance the various costs associated with the web sites, including but not limited to storage, content creation and administration, and thus enable the prosperity of internet sites and web applications, their owners and providers usually take one of two approaches: charging the users or selling screen space and displaying messages such as advertisements. The first approach of charging the users has its drawbacks as users are becoming more and more reluctant to pay for information they feel should be free. The second approach, of selling screen space to advertisers is also problematic: users find the messages and in particular advertisements annoying, avoid cooperating by not clicking on links, and most of all stop noticing and recognizing the messages. Advertisers and web site owners on the other hand become more aggressive, for example by displaying a pre-content message taking up the whole screen, which can be eliminated only after a predetermined period of time, displaying messages showing moving objects, or messages which move from one location on the screen to the other in order to attract the viewer's attention, or the like. In some cases, the user may become so antagonistic to the displayed messages, that only after the message has disappeared, he or she realizes they may be interested in the product or service, but then may have no access to it. In other cases, the messages become so aggressive and annoying that some users may avoid the site at all.

There is thus a need in the art for a method and system for displaying messages in a manner that would not annoy users and make them develop antagonism to the displayed product or service, but will still be noticed and effective so that the users will internalize and remember the message.

BRIEF SUMMARY

One exemplary embodiment of the disclosed subject matter is a computer-implemented method performed by a computerized device, comprising: receiving a reading from a sensor associated with a mobile computing device used by a user; determining based on the reading whether the device is in movement exceeding a threshold; responsive to the movement exceeding the threshold, displaying a message in a first manner; and responsive to the movement not exceeding the threshold, displaying the message in a second manner. Within the method, the first manner is optionally associated with the message obstructing content on the device, and the second manner is optionally associated with content displayed on the device being obstructed less than when the movement exceeds the threshold. Within the method, the threshold is optionally determined in accordance with a situation of the user. The method may further comprise determining a position of the user. Within the method, the position is optionally selected from the group consisting of: walking, standing, sitting and lying. The method may further comprise determining whether the user and the mobile computing device are in a moving environment. The method may further comprise determining a situation of the user; and determining the threshold based on the situation. The method may further comprise determining a type of vehicle the user and the mobile computing device are in; and determining the threshold based on the type of vehicle. The method may further comprise responsive to the movement exceeding the threshold, determining based on the reading whether the movement is due to the device and the user being in a moving vehicle; and responsive to determining that the device and the user are in a moving vehicle, displaying the message such that content displayed on the device is obstructed less than when the movement exceeds the threshold. Within the method, when the reading indicates increasing motion, the message is optionally displayed more boldly and the content is displayed in a more obstructed manner. Within the method, the message is optionally abruptly displayed in a more prominent manner and the content is abruptly displayed in a more obstructed manner. Within the method, when the reading indicates decreasing motion, the message is optionally displayed less boldly and the content is displayed in a less disrupted manner. Within the method, the message is optionally displayed less boldly and the content is displayed in a less obstructed manner after a predetermined delay. Within the method, the message is optionally gradually faded out and the content is gradually displayed in a less obstructed manner. Within the method, the movement not exceeding the threshold or the movement indicating that user and the device are in a moving vehicle, may be associated with the user being attentive to the device, and the movement exceeding the threshold and not associated with a moving vehicle is associated with the user being inattentive to the device. Within the method, the message is optionally displayed with a graphic aspect corresponding to the content displayed on the device. Within the method, the message is optionally displayed with a shadow surrounding figures or letters or the message. Within the method, a difference between the first manner and the second manner may relate to one or more factors selected from the list consisting of: boldness, location; rotation angle; vibration; color; size; animation; addition of a moving element, addition of a moving element to a banner; and adding an element.

Another exemplary embodiment of the disclosed subject matter is an apparatus comprising a mobile device having a processing unit and a storage device, the apparatus comprising: a sensor for providing movement indication of the mobile device; a sensor communication component for receiving a reading from the sensor; a movement assessment component for determining based on the reading whether the mobile device is in movement exceeding a threshold; and a display component for (i) displaying a message in a first manner responsive to the mobile device being in movement exceeding a threshold, and (ii) displaying the message in a second manner when the movement exceeds the threshold, responsive to the movement being below the threshold. Within the apparatus, the first manner optionally relates to displaying a message while obstructing content displayed on the mobile device, and the second manner optionally relates to the content being less obstructed than when the movement exceeds the threshold, responsive to the movement being below the threshold. The apparatus may further comprise a vehicle type determination component for determining based on one or more readings in which vehicle type the mobile device and a user thereof are. The apparatus may further comprise a threshold assessment component for determining the threshold. The apparatus may further comprise a state assessment component for determining attention level of a user using the mobile device based on output of the movement assessment component. Within the apparatus, the reading optionally indicates increasing movements, the message is displayed more boldly and the content is displayed in a more obstructed manner. Within the apparatus, the message is optionally abruptly displayed more boldly and the content is optionally displayed abruptly in a more disrupted manner. Within the apparatus, the reading optionally indicates decreasing movements, and the message is optionally displayed less boldly and the content is displayed in a less disrupted manner. Within the apparatus, the message is optionally displayed less boldly and the content is optionally displayed in a less disrupted manner only after a predetermined delay. Within the apparatus, the message is optionally gradually faded out and the content is optionally gradually displayed in a less disrupted manner. Within the apparatus, the movement not exceeding the threshold or the movement indicating that user and the mobile device are in a moving vehicle is optionally associated with the user being attentive to the mobile device, and the movement exceeding the threshold and not associated with a moving vehicle is optionally associated with the user being inattentive to the mobile device. Within the apparatus a difference between the first manner and the second manner may relate to one or more factors selected from the list consisting of: boldness; location; rotation angle; vibration; color; size; animation; addition of a moving element, addition of a moving element to a banner; and adding an element. The apparatus may further comprise a server computing platform for receiving a reading from the mobile device, analyzing the reading and returning a result to the mobile device.

Yet another exemplary embodiment of the disclosed subject matter is a computer-implemented method performed by a computerized device, comprising: receiving a reading from a sensor associated with a mobile computing device used by a user; determining based on the reading whether the user is attentive to the device; responsive to the user being inattentive to the device, displaying a message in a first manner; and responsive to the user being attentive to the device, displaying the message in a second manner. Within the computer-implemented method, whether the user is attentive to the device is optionally determined in accordance with the user's looking direction and eye movements.

Yet another exemplary embodiment of the disclosed subject matter is a computer program product comprising: a non-transitory computer readable medium; a first program instruction for receiving a reading from a sensor associated with a mobile computing device used by a user; a second program instruction for determining based on the reading whether the device is in movement exceeding a threshold; a third program instruction for responsive to the movement exceeding the threshold, displaying a message in a first manner; and a fourth program instruction for responsive to the movement not exceeding the threshold, displaying the message in a second manner; wherein said first and second program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Some embodiments address a problem of displaying messages to users of mobile devices, such that on one hand the displayed messages will not annoy the users and will not make them feel they are deprived or otherwise disrupted from consuming or sharing the contents as they would like to, but on the other hand, the messages should be displayed for long enough time, and in an effective location and manner such as bolded, in order to be noticed and recognized by the users and therefore worthwhile for the owner such as the advertiser.

Another problem dealt with by various embodiments is the user intentionally or unintentionally ignoring the messages. In some cases, the user may be so antagonistic to the message and in particular advertisements, that only once the message disappears he or she may realize they may be interested but then cannot access it anymore. Additionally, the period of time in which the message is displayed is too short for the cognitive processes related to decision making and selection, thus making the message less effective.

Another technical problem dealt with by various embodiments is the use of mobile devices in various environments such as various vehicles moving in different kinematic patterns. Components of the device, or programs executed by the device may determine the movements of the device. However, these movements may be combinations of movements due to motions of the user and movements due to the moving environment in which the device is used. In general, such movements may indicate the situation of the person, including his position, such as standing, sitting, lying down, walking or another physical position, and the environment, such as whether the person is in a stable environment or in a moving environment such as a vehicle of any type. The situation may also be affected by additional factors such as physical condition of the user, device processing speed, or the like. Thus, it is required to determine the situation including the environment, and once the environment is determined, it is required to further determine whether the user is holding the device stably and may thus be considered attentive, or not.

The term mobile device may relate to any mobile computerized device, such as a laptop, a tablet computer, a mobile phone, a smartphone, a wearable device such as a computerized watch or glasses, or any other mobile device having computational resources.

The term vehicle or vehicle type refers to a moving environment, such as a bus, a train, a private car, a bike, a rickshaw, a bicycle, a plane, or the like. Each vehicle or vehicle type moves in a unique kinematic pattern, comprising a combination of accelerations and decelerations in any of the three dimensions.

The term sensor refers to a device or component located on or integrated with a mobile device, such as an accelerometer, a gyroscope, a GPS, a touch sensor, a camera, or the like. Each sensor may provide information about location, velocity, acceleration, orientation, tilt angle, or the like, and may provide a current reading, an accumulated reading, or a change indication from a previous reading.

The term threshold refers to a predetermined value to which a measure may be compared. Thresholds may refer to a kinematic parameter, such as location, velocity, acceleration, rotation angle, tilt angle or the like, and may relate to any axis or direction.

The term state may refer to a state of a person, including for example physical state such as healthy or suffering from unintentional movements, concentrated/attentive or not which may be evaluated based on the displayed material, for example if a scientific article is displayed the person may be assumed to be concentrating.

The term situation of a user may refer to a combination of one or more of the following or possibly additional factors: the physical position of the user, such as whether the person is lying down, sitting, standing, walking or the like; the environment such as whether the person is in a stationary environment or in a moving environment such as a vehicle; and a state of the user.

The term message may refer to an advertisement, an announcement, a pole, a news flash, a stock quote, a sports news flash, an e-mail indication, an instant messaging indication, a chat indication, a device health message, an application message, a message from a web application, or others, which may be displayed to a user.

The term environment may refer to where the device and the user are present, for example identification of a vehicle type. Other environments may also relate to a stationary environment such as a home or an office, or the like.

The term obstructs refers to the interrelations between a message and content. The message obstructing the content refers to the message being displayed such that it at least partially hides, covers, disturbs or interferes with viewing or accessing the content. Graphically, it may be described as if the message is displayed over the content.

One technical solution relates to providing a system and method for assessing the movements of the mobile device which are related to the user using the device. If the device is unstable, for example moved or rotated, it may indicate that a user is not fully attentive to the device, and is currently not consuming or sharing information. Under these circumstances, a message may be displayed in a bold manner, for example fully or partially obstructing the actual content displayed. The message may be displayed over a large area of the display or the like. The message may thus fully or partially obstruct or otherwise disturb the user from viewing the actual content displayed. Additionally or alternatively, the message may otherwise be bolded in accordance with the user's attentiveness and period of time, for example by using darker colors, larger letters, or another wise making it more prominent or noticeable when the user is inattentive, and vice versa. However, the message may not prevent the user from activating the device. The user may close the message, activate other applications, dial or answer a phone call, send or receive a message, or the like. Once the user becomes attentive to the device, the message may keep displaying or keep being bolder for a short period of time so as not to annoy the user but still have the user notice it and enable the user to react. Then the message may gradually fade out and thus expose the content or may be made less bold, until it eventually remains as a light background, for example similar to watermark, or completely disappears.

Another technical solution relates to distinguishing between movements of the device that originate from motions of the user, which may indicate inattentiveness to the device, and movements stemming from motions of the environment of the user and the device. Thus, only movements exceeding predetermined thresholds, wherein the predetermined thresholds may be associated with the environment may be considered.

The movements of the device may be evaluated from readings or reports by any one or more sensors.

Thus, when a user is using the device while in a moving environment or in a particular physical position, motions caused by the moving environment may be tolerated and not interpreted as inattentiveness, such that displaying the messages may continue in the background manner so that it does not obstruct the content. Therefore, it is required to determine whether and which environment the user is in, and to set the thresholds accordingly.

One technical effect of utilizing some embodiments is determining when a user is attentive to the device and would probably be irritated if a message is displayed with significant prominence and is obstructing or preventing access to the content, and when a user is not fully attentive, in which case the device may show one or more messages which may obstruct the displayed content. The user may occasionally view the messages when not attentive to the device, and may also view them for a short time when regaining attentiveness to the device and content. The messages may then keep showing in a fading or faded manner, such that the user will keep seeing them, may access them if desired, and may internalize and recognize them. It will be appreciated that even when the message is displayed with significant prominence, the user may still retain control of the device, for example the user may hide the message, switch to another application, make a phone call or do any other operation with the device.

Another effect of utilizing some embodiments is the feeling of expectancy and continuity offered to the user, when the message does not pop up or disappear surprisingly, but rather moves between the "front" view in which it is fully visible but only for a very short duration after the user becomes attentive to the device, and the "back" when it is visible and accessible but does not interfere with the content the user is watching.

Yet another technical effect of utilizing some embodiments is the enablement of effective display of messages while in various kinds of environments. By determining the situation of the user which may include the type of environment, such as the type of vehicle a user is riding, the thresholds of motions indicating attentiveness or inattentiveness may be adjusted, such that motions may be determined to be related to movements of the environment, or to movements caused by the user, which may indicate inattentiveness.

Figure 1A:
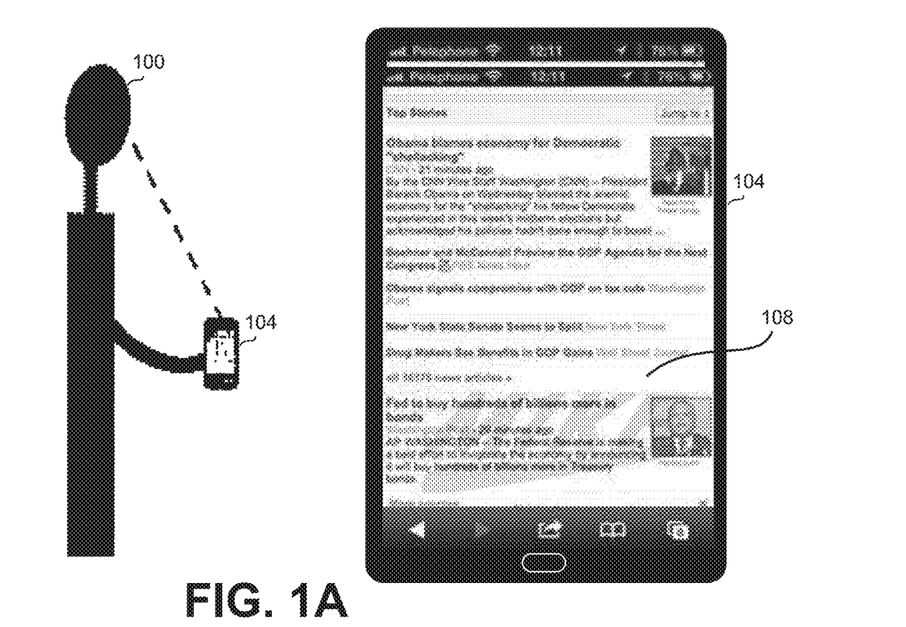
FIG. 1A and FIG. 1B show schematic illustrations of mobile devices showing a message when the user is attentive and inattentive, respectively, in accordance with some embodiments of the disclosed subject matter.
Figure 1B:
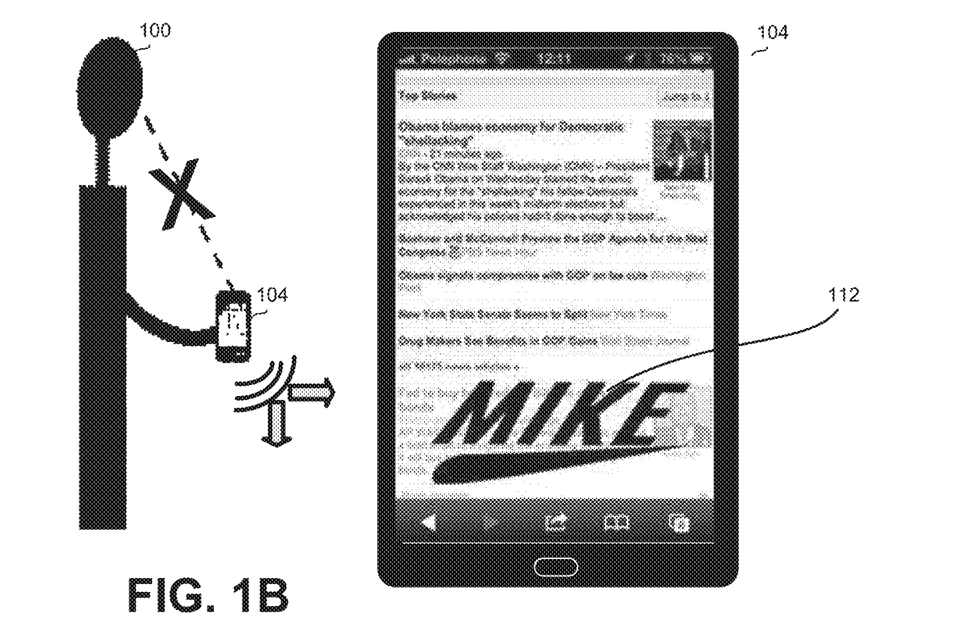

Referring now to FIGS. 1A and 1B showing schematic illustrations of mobile devices showing messages when the user is attentive and inattentive.

User 100 is using a mobile device 104. In FIG. 1A a user 100 is holding the device stably and is therefore assumed to be focusing on the displayed content. It will be appreciated that the term stable may also refer to the device moving in small motions or rotations due to natural variations in the user's posture and position. Such movements may be characterized as having values of amplitude, angle, velocity, radial velocity or any other kinematic variables or a combination thereof, below predetermined thresholds.

Since the user is assumed to be focusing, a message, for example an advertisement 108 selected by a server providing the content displayed to the user, may be displayed in a faded or fading manner, similarly to a watermark, such that it can be noticed and seen but does not interfere with the content, such that the user can keep viewing, reading, or creating the content.

In some embodiments, the message may be displayed in the area below the horizontal center line in the display, for example on the third quarter from the top of the display.

In FIG. 1B, however, the device is moving more than the threshold in amplitude, angle, velocity, or any other parameter or combination, and thus it is assumed that the user is not attentive to the device. Therefore, a message may be displayed such that it does obstruct part or all of the displayed content as shown in advertisement 112. When the device motions decrease to below the threshold, the user is assumed to resume focus. Then, advertisement 112 may, possibly after a predetermined delay, fade out and appear similarly to advertisement 108 described above, which does not block user 100 from consuming or creating content with device 104.

It will be appreciated that the message being shown in multiple manners may be implemented in a variety of ways. In one example, the message may be displayed as a banner, wherein the boldness of the banner may increase when the user is inattentive and decrease when the user is attentive. In further embodiments, when the user is inattentive the banner may be displayed more prominently by adding a moving element, such as a bright vertical stripe moving horizontally over the banner.

Figure 1C:
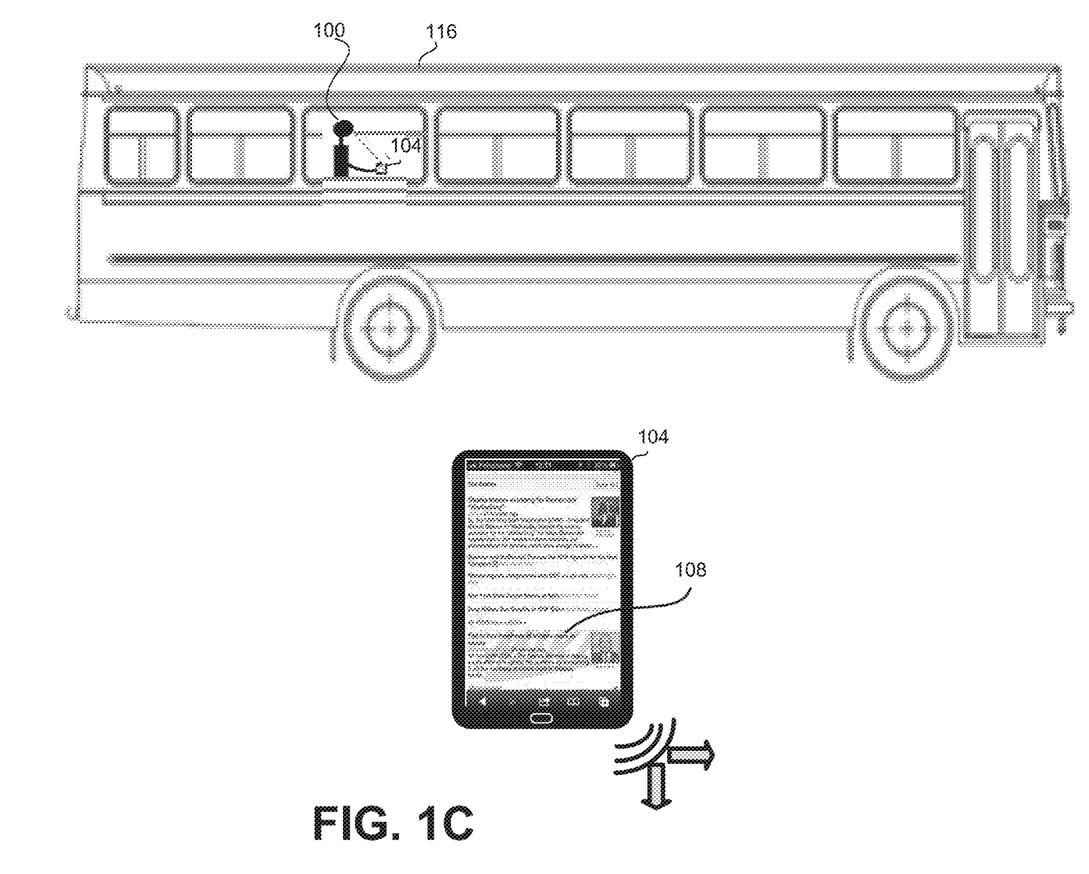
FIG. 1C shows a schematic illustration of a mobile device showing a message when used in a moving environment, in accordance with some embodiments of the disclosed subject matter.

Referring now to FIG. 1C, showing user 100 using device 104 while riding bus 116 or any other vehicle such as a car, a train, a plane or the like. Although sensors of device 104 may indicate movements larger than any threshold, the movements may still be interpreted as caused by movements of the whole environment and not due to user inattentiveness. Therefore, device 104 will display advertisement 108 in a faded manner, such that it will not disturb user 100 from consuming or creating content.

Figure 2A:
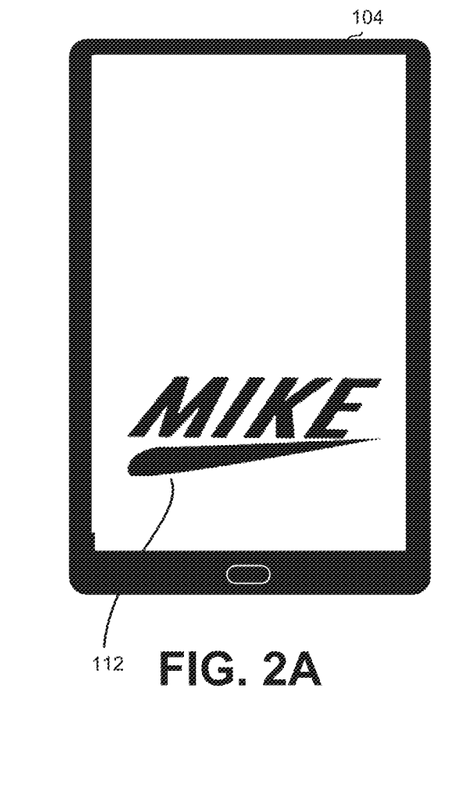
FIG. 2A-2C show schematic illustrations of mobile devices showing messages in various presentation manners, in accordance with some embodiments of the disclosed subject matter.
Figure 2B:
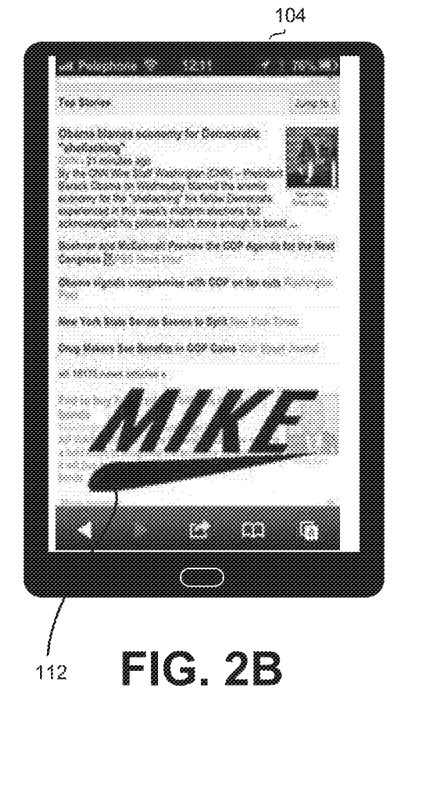
Figure 2C:
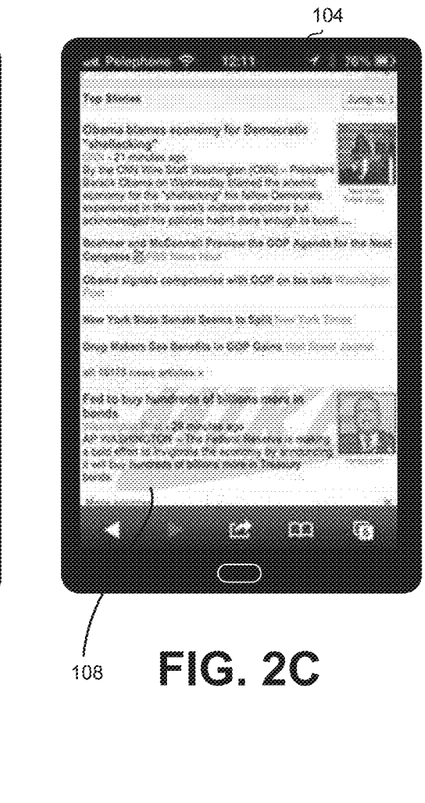

Referring now to FIGS. 2A-2C, showing schematic illustrations of mobile devices showing messages in various presentation manners.

FIG. 2A shows mobile device 104 showing message 112 while fully obstructing the actual content that was displayed. The message is displayed when the user is inattentive to the device. Once the user resumes attention or a short time afterwards, for example between a fraction of a second and a few seconds, message 112 may fade out and the content may become visible.

FIG. 2B shows mobile device 104 showing message 112, while the actual content that was displayed is fading, such that it is possible but not easy or convenient to view it. The message is displayed when the user is inattentive to the device. Once the user resumes attention or a short time afterwards, for example between a fraction of a second and a few seconds, message 112 may fade out and the actual content may be displayed as intended.

FIG. 2C shows mobile device 104 showing message 108 as watermark or background and not obstructing the actual content. Thus message 108 does not interfere with reading the actual content displayed. Message 108 may be displayed as background when the user is attentive to the device and viewing the content.

It will be noted that FIG. 2B shows mobile device 104 with message 112 and actual content, wherein message 112 is on the front and hides at least part of the actual content, while FIG. 2C shows mobile device 104 with message 108 and actual content, wherein message 108 on the back and does not hide the actual content. It will be appreciated that message 108 and message 112 are the same message, only displayed in different prominence degrees, while the actual content is also displayed in different manners.

In some embodiments, parts of the message may be rendered with a shadow surrounding one or more images or letters or the whole message, such that the shadow separates between the message and the actual content and makes it easy to tell the message from its surrounding.

It will be appreciated that graphic aspects of the displayed message, such as text color and font, shadow color, background color, or other parameters may be set dynamically in accordance with the displayed content. For example, if the actual content contains many black and white parts and the message is mostly black, a third color such as red may be selected for the shadow of the message, such that the message is clearly seen even in faded mode. Each message may be associated with preferred or barred colors which may relate to trademarks associated with the message. For example, a message advertising a bank for which the dominant advertisement color is red, is unlikely to allow a blue shadow but is more likely to select a white message with red shadow.

Thus, the disclosure relates to presenting a message in two or more manners, such that when the device moves less than a predetermined threshold or more than the predetermined threshold but in a manner associated with a moving environment, the user is assumed to pay attention to the device, and the message is displayed such that it is visible but does not disturb the user in viewing or creating the actual content displayed. When the device moves more than the threshold but in a manner that cannot be explained by a moving environment such as a vehicle, the message is displayed such that it blocks or disturbs the user from viewing the actual content. When the user resumes attention, the message may fade out gradually or abruptly, such that the actual content becomes fully viewable.

Figure 3A:
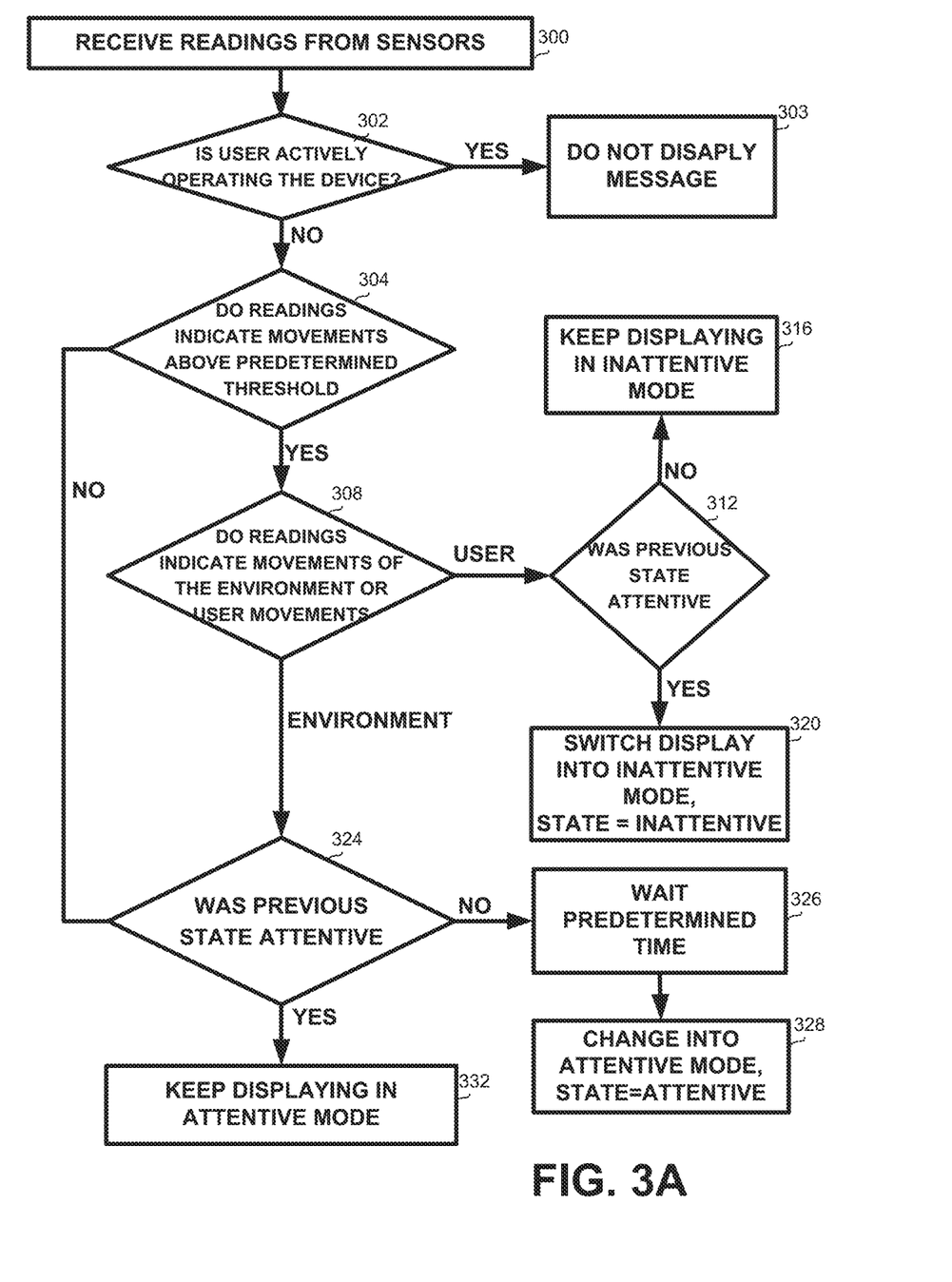
FIG. 3A is a flowchart of steps in a first embodiment of a method for showing messages in various usage modes, in accordance with some embodiments of the disclosed subject matter.

Referring now to FIG. 3A, showing a flowchart of steps in a first embodiment of a method for showing messages in various usage modes.

Prior to the beginning of the disclosed steps, a system performing the method may be in an attentive-related state or not. The state may be represented as a binary variable associated with attentive or inattentive values. Alternatively, the state may be represented by a variable that can be assigned one of a multiplicity of values representing a scale of attention levels.

On step 300, readings may be received from one or more sensors or other systems associated with the mobile device. Any of the sensors may provide a current reading, an accumulated value, a value change since a previous reading or the like.

On step 302, which may also be performed prior to step 300, it may be determined whether the user is actively operating the device, for example scrolling, starting an application, typing a message, or the like. If the user is indeed operating the device, step 303 is activated in which no message is displayed.

On step 304 the readings, possibly together with previous readings may be analyzed to determine whether they indicate movements exceeding one or more thresholds. For example, a location difference may be checked for exceeding a few centimeters for example 5 cm, a rotation may be checked for exceeding a few degrees for example 10°, or any other value or value combination may be checked for exceeding a threshold associated with attentive reading of material. The thresholds may be default thresholds or thresholds determined earlier.

It will be appreciated that the threshold may be personalized for a particular person or group of persons. For example, young users having more stable hands may be associated with lower thresholds than those of older people.

The default threshold may also be associated with the position of the person, such as sitting, standing, lying down, walking or the like. The position may be determined based on the same measures or on additional measures. For example, the user lying down may be deduced from readings of one or more gyroscopes installed on the device.

It will also be appreciated that the threshold may be associated with the particular message to be displayed or with the content known to be displayed on the mobile device. For example, a scientific article which is likely to be read with high attentiveness may be associated with lower thresholds since it may be assumed that once a user makes even smaller moves, he or she may not be focusing on complex material. The threshold may also be personalized for the specific user, for example for a person suffering from unstable hands or unintentional movements, specific thresholds may be set which will eliminate displaying messages.

If the readings do not exceed the threshold, indicating that the user may be attentive, then on step 324 it is determined whether the device was previously in an attentive state (or in attentive state exceeding a predetermined level).

If the device indeed was in attentive state, then on step 332 the message is being displayed in the same attentive manner it was displayed (or is newly displayed in an attentive manner), such that the message does not obstruct the content. Attentive manner may relate to the message being displayed such that it enables the user to keep reading or creating the content, for example as a shaded message, a watermark or in another undisturbing manner, that still allows the user to be exposed to the message.

If the device was in inattentive state, then a predetermined delay may be taken on step 326, to enable the user to fully view the message, and on step 328 the message display may be changed into attentive mode. Changing into attentive mode may be done by fading out a displayed message and showing the actual content the user is consuming or creating. In some embodiments, fading out may be performed only after a predetermined period of time during which the message is displayed prominently. Fading out may be performed in any required pace, which may be personalized, may depend on the content or the message, or the like. In some embodiments, the duration in which the device is in its current attention mode may be measured, and the fading pace may also depend on that duration. For example, after a short inattentive state, such as if the user only lowered the device for a short time, fading may be performed faster than after a longer inattentive state.

Fading out may be performed by changing a transparency level of the message or the content, changing a color of the content to darker shades, changing the color of the message to lighter shades, exposing hidden content or controls, or the like.

At this step the device state may also be changed to attentive.

If the readings analyzed on step 304 indicate movements exceeding the thresholds, then on step 308 it may be determined whether the readings may indicate movements of the environment such as a moving vehicle, for example a bus, a train, a plane, or the like. Generally, such movements may be associated with significant distances, for example tens of centimeters or more per second and optionally along one direction. In some embodiments, rotation thresholds may be low for such movements, as the vehicle and people therein are not assumed to be rotating.

In some embodiments, whether the readings are associated with a moving environment or human motions may be determined by the readings in different dimensions and their interrelationships. For example, a high velocity or high acceleration in the Z direction may indicate a vehicle jump, while a slower motion in the Z direction may indicate a user motion. In another example, a significant velocity in direction X, Y or a combination thereof may indicate a moving vehicle, and from thereon only motions in the Z direction may be considered, as user generated movements are likely to be very small relatively to the vehicle movements.

If the movements are associated with a moving environment and not with user motions, the user is assumed to be attentive and execution passes to step 324 discussed above.

If the movements are associated with a user rather than a moving environment, then on step 312 it is determined whether the device state was attentive. If the device was in inattentive state, then on step 316 the message is displayed in inattentive mode, i.e., having significant prominence, e.g. covering, hiding or not showing the actual content.

If the device was in attentive mode, then on step 320 the display is switched into inattentive mode, e.g., the message is obstructing the actual content more than in an attentive mode. Switching into inattentive mode may also be performed gradually by making the message bolder and the content lighter, but may also be performed abruptly, since the user is anyway assumed to be inattentive to the device. In this case the state of the device is switched into inattentive state.

Changing the display of a message between attentive and inattentive mode may be performed by changing a transparency level of the message or the content, changing a color of the content to lighter shades, changing the color of the message to darker shades, hiding content or controls, or the like.

It will be appreciated that the disclosed flowchart may be repeated as often as required, for example every few milliseconds, seconds or the like. The period of time may also vary in accordance with the state. For example, when the device is in attentive state, the flow may be repeated every few seconds or more, but if the device is in inattentive state it may be repeated more often for example every fraction of a second, so that when the user resumes attention he or she will not have to wait long before they can resume their activity with the device.

Further embodiments for determining whether the device is in attentive or inattentive state and for displaying messages and/or content may be as disclosed in U.S. provisional Application No. 61/820,732 filed on May 8, 2013 which is hereby incorporated by reference in its entirety and for all purposes. The changing of the display between attentive and inattentive states may be such that the message remains at the same location and same size on the display, thus maintaining continuity, expectancy and confidence of the user. When elements change gradually and not appear, disappear or change abruptly, and when the message does not block the user from viewing or creating content for excessive periods of time, the user may feel more in control of the situation and is less likely to develop antagonism to the system and the displayed messages. On the other hand, the message remains visible and optionally in a central location on the screen for longer periods of time and may thus achieve the required exposure and internalization.

It will be appreciated that in some embodiments the method may be performed only when the device is active rather than idle, and only when the user is in online communication with a network, for example viewing or creating information.

It will be appreciated that switching between attentive and inattentive modes may be performed in a multiplicity of ways. In some embodiments, the message and the actual content may be rendered on different layers, and the order of the layers may be switched, or transparency level of any layer may be changed. For example, when in inattentive mode, the message layer may become the top layer with zero or another low transparency, such that it blocks the layer of the actual content. When switching to attentive mode, the message layer may assume a higher transparency degree. Alternatively, the message layer may become the lower layer, but the content layer may assume some degree of transparency, such that the message layer is visible.

Figure 3B:
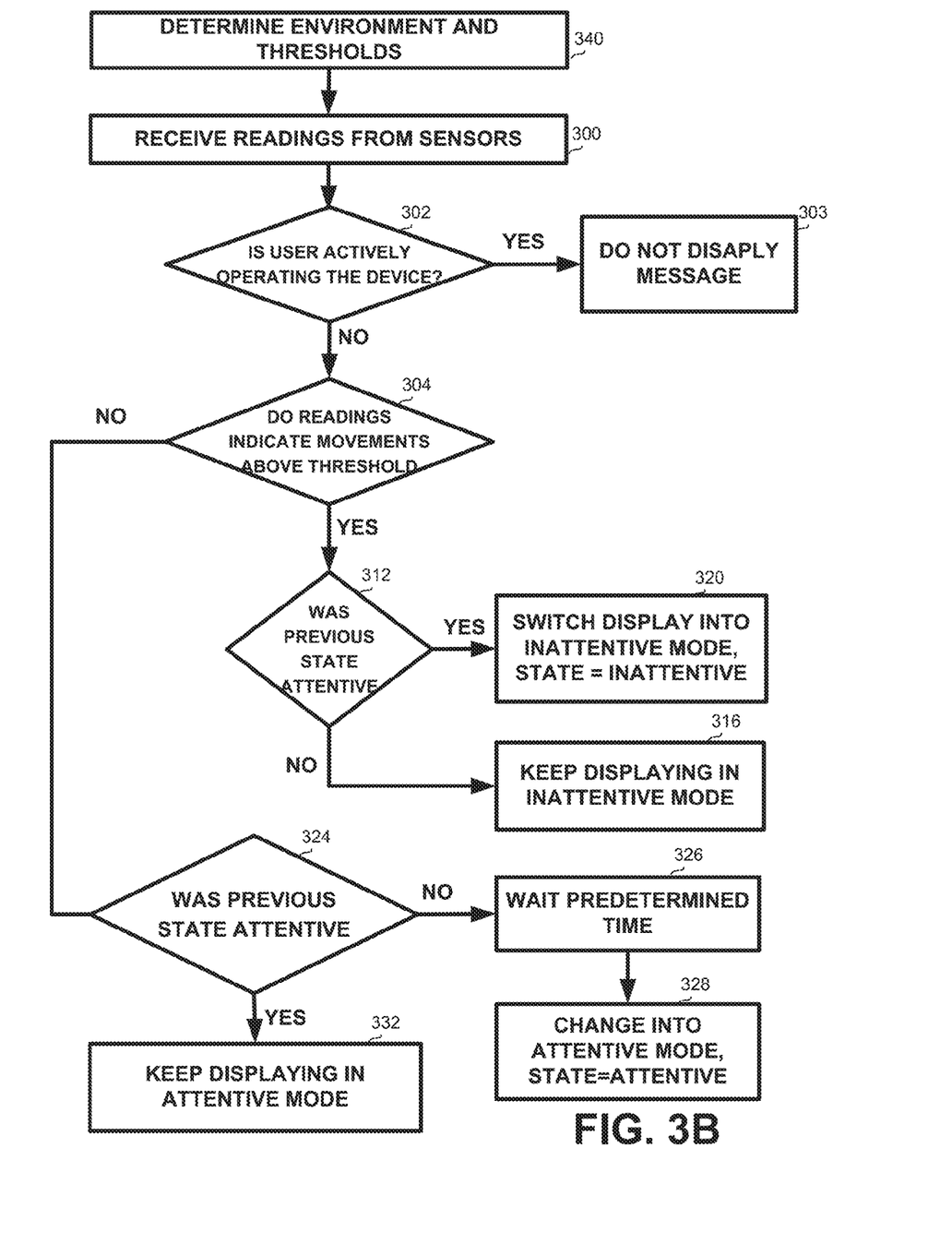
FIG. 3B is a flowchart of steps in a second embodiment of a method for showing messages in various usage modes, in accordance with some embodiments of the disclosed subject matter.

Referring now to FIG. 3B showing a flowchart of steps in a second embodiment of a method for showing messages in various usage modes.

On step 340, and optionally based on previous readings from sensors, input provided by the user, or any other source, the environment in which the device and the user are present may be determined.

The environment may be determined based upon one or more kinematic patterns in either direction or direction combination. The environment may be determined as described for example, in "The Jigsaw Continuous Sensing Engine for Mobile Phone Applications" by Hong Lu, Jun Yang, Zhigang Liu, Nicholas D. Lane, Tanzeem Choudhury and Andrew T. Campbell and published in SenSys 2010, Nov. 3-5, 2010, Zurich, Switzerland, the full contents of which is incorporated herein by reference for all purposes.

Based on the environment, relevant thresholds may be determined. For example, a base threshold may be set for walking, for riding a bicycle, or the like. In some vehicles, certain measurements may be more significant than others. For example, the turning angle will be more significant when determining the threshold for a car than when determining thresholds for a train which tends to advance more along straight lines, while the accelerometer measures may be more significant for a train than for a car. The thresholds may also be personalized for the user in accordance with learned or reported movement patterns. The thresholds may also be influenced by characteristics of the mobile device, such as the processing speed of the device. For example, a device having a dedicated chip for taking and processing the measurements may thus is faster or more sensitive such that different thresholds may be set since measurements may be taken and processed at smaller time intervals.

The thresholds may relate to one or more kinematic parameters or one or more directions. For example, when a person is riding a vehicle moving substantially in a straight line such as a train, motions along the advancement direction may be ignored. i.e., a high threshold may be set, as information about user motions in this direction are unlikely to exceed the measurement noise. However, motions along the Z direction, rotations in the X-Y direction, or other motions may be considered as indicating user motions and thus low thresholds may be set for these motions, such that small motions in this direction may indicate inattentiveness of the user.

In some embodiments, one or more messages may also be determined according to the vehicle type. For example, if it is determined that a person is riding a train, an advertisement may be suggested for a service provided at the central train station.

The method may then continue as follows, wherein some steps are substantially the same as detailed in association with FIG. 3A above.

On step 300, readings may be received from the various sensors.

On step 302, which may also be performed prior to step 300, it may be determined whether the user is actively operating the device, for example scrolling, starting an application, typing a message, or the like. If the user is indeed operating the device, step 303 may be operated, in which no message is displayed.

Otherwise, it may be determined on step 304 whether the readings indicate movements exceeding the thresholds as determined on step 340 in accordance with the environment.

If the readings exceed the thresholds, it is an indication that the user is inattentive. Then it is determined on step 312 whether the previous state of the device was attentive. If it was attentive, then on step 320 the display is switched into inattentive state and the state of the device is set to inattentive. If it was inattentive, then on step 316 the device remains in the inattentive mode.

If the readings do not exceed the thresholds, it is an indication that the user is attentive. Then it is determined on step 324 whether the previous state of the device was attentive. If it was attentive, on step 332 the display remains in the attentive mode in which the message obstructs the content less than in the inattentive mode.

If it was inattentive, then on step 326 a delay can be taken such that the user may notice the message, and on step 328 the display may be switched into attentive state and the state of the device may be set to attentive.

It will be appreciated that environment and threshold determination step 340 may be repeated prior to receiving any reading from the sensors, or at other time intervals, such as after a predetermined time interval, after the environment has not changed for at least a predetermined time interval, a user selected time interval, or the like. Once the environment has been determined to be different then a previous environment, the threshold may be reduced relatively to a previous threshold, thus providing for interpreting movements which are lower than previous thresholds, as exceeding the thresholds. For example, if a person is riding a bus, a high threshold may be set, for the sake of the example, 20 km/h, such that speed of 10 km/h does not exceed the threshold and may represent stable environment. When the person gets off the bus and starts walking, the environment and threshold may be changed, for example the threshold may be set to 5 km/h, such that a speed of 10 km/h will be considered as exceeding the threshold. Thus, re-assessing the environment and threshold may provide for more exact behavior.

It will be appreciated that while the embodiment of FIG. 3B may be more suitable for a changing environment and the embodiment of FIG. 3A may be more suitable for a stable environment, occasional determination of the situation, environment and thresholds may also improve the performance when using the embodiment of FIG. 3A. Determination of the situation, environment and thresholds may also be useful for people with inconsistent disabilities, such as people suffering from Parkinson disease.

Figure 4:
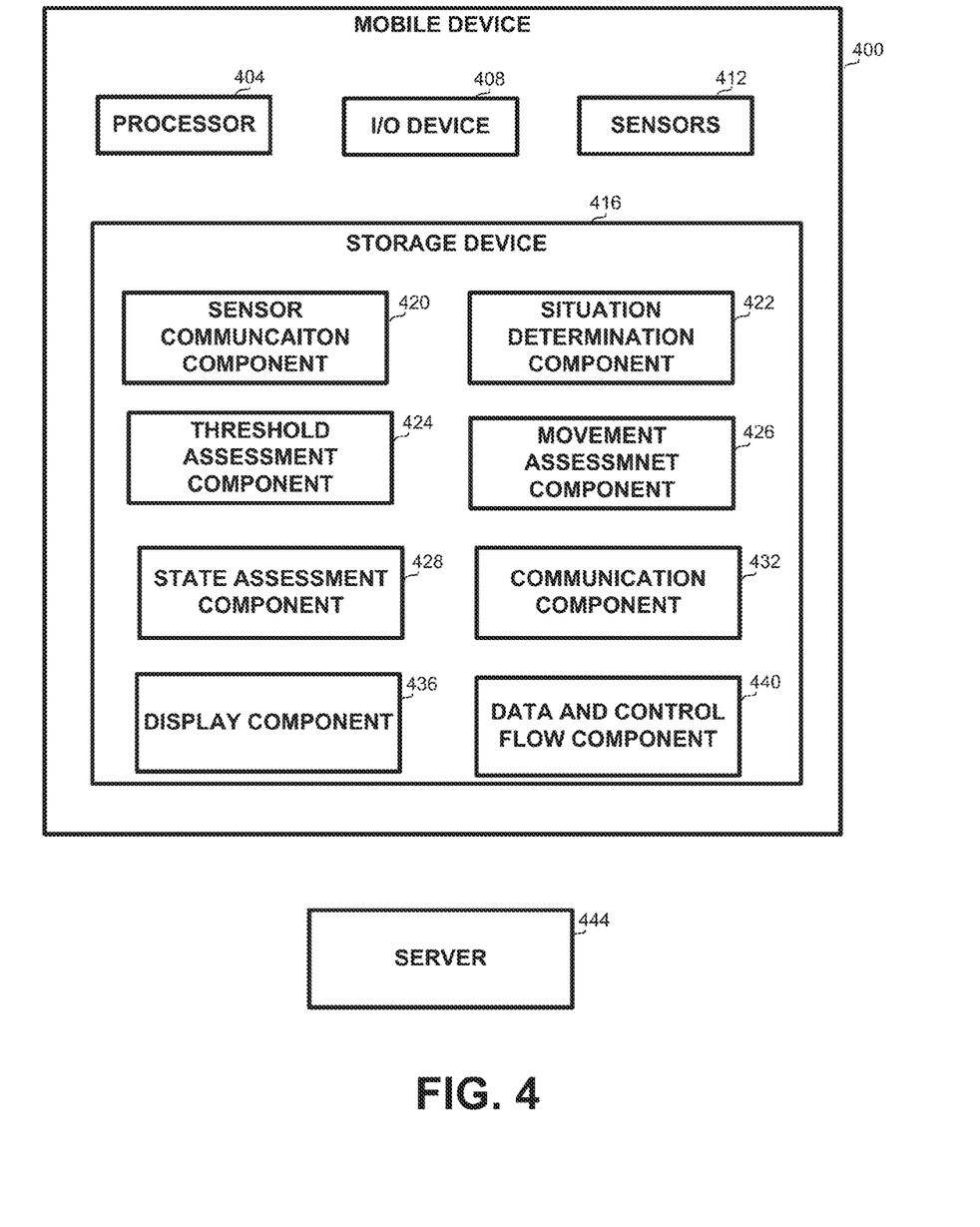
FIG. 4 is a schematic block diagram of the components in system used by a mobile device for showing messages in various usage modes, in accordance with some embodiments of the disclosed subject matter.

Referring now to FIG. 4, showing a schematic block diagram of the components of a mobile device showing messages in various usage modes.

The apparatus enables mobile device 400 to show messages. Mobile device 400 may be any mobile device equipped with communication channel to data sources such as the Internet. The communication channel may be Wi-Fi, GSM, or any other channel operating under any protocol.

In some exemplary embodiments, mobile device 400 may comprise a processor 404. Processor 404 may be a Central Processing Unit (CPU), a microprocessor, an electronic circuit, an Integrated Circuit (IC) or the like. Alternatively, processor 404 can be implemented as firmware programmed for or ported to a specific processor such as digital signal processor (DSP) or microcontrollers, or can be implemented as hardware or configurable hardware such as field programmable gate array (FPGA) or application specific integrated circuit (ASIC).

Mobile device 400 may also comprise one or more I/O devices 408 such as a display, a keyboard, a touch sensor, or the like, to interact with the device, provide commands, and receive data or results such as view content, surf the internet, view e-mails or the like.

In some exemplary embodiments, mobile device 400 may comprise one or more sensors 412, providing information about the position or orientation of the device, or changes thereto.

In some exemplary embodiments, mobile device 400 may comprise or be operatively connected to one or more storage units or storage devices such as storage device 416, for storing for example user preferences and characteristics, mobile device details, vehicle kinematic patterns, or the like. Storage device 416 may be persistent or volatile. For example, storage device 416 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 416 may retain program code operative to cause mobile device 400 to perform acts, such as acts associated with any of the steps of the method of FIG. 3A or 3B detailed above.

The components detailed below may be implemented as one or more sets of interrelated computer instructions, executed for example by processor 404 or by another processor, or loaded to or stored on storage device 416. The components may be arranged as one or more executable files, dynamic libraries, scripts, static libraries, methods, functions, services, or the like, programmed in any programming language and under any computing environment. Each of the components detailed below may be stored statically or loaded dynamically at runtime to storage device 416.

The components loaded to storage device 416 may include sensor communication component 420 for receiving readings from any of sensors 412. The readings may be received by any appropriate protocol or channel.

Storage device 416 may also store situation determination component 422 for determining based on one or more readings whether a user is standing, sitting or lying down, or whether the user and the device are inside a moving vehicle, and possibly the vehicle type. Determining the environment and in particular the vehicle type may be performed as detailed in "The Jigsaw Continuous Sensing Engine for Mobile Phone Applications" by Hong Lu, Jun Yang. Zhigang Liu, Nicholas D. Lane, Tanzeem Choudhury and Andrew T. Campbell and published in SenSys 2010. Nov. 3-5, 2010, Zurich, Switzerland, the full contents of which is incorporated herein by reference for all purposes. It will be appreciated that situation determination component 422 may comprise separate or combined components for determining a position of the user, a vehicle type in which the user and the device are present, a state of the user, or the like.

Storage device 416 may comprise threshold assessment component 424 for determining the relevant movement threshold for the situation, depending on whether the person is in a vehicle and which kind, whether the person is sitting, standing, walking or lying down, or the like.

Storage device 416 may comprise movement assessment component 426 for assessing the movements of mobile device 400, for example determining how much the device has moved or rotated in any direction, at what velocity, acceleration, radial velocity, radial acceleration, or the like.

Yet another component which may be loaded to storage device 416 is state assessment component 428, which determines based on the movements assessed by movement assessment 424 whether the device is stable relatively to a user even if the user and the device are in a moving vehicle, in which case the user may be assumed to be attentive to the device, or unstable in which it may be assumed that the user is inattentive to the device.

Storage device 416 may comprise communication component 432 for communicating with data sources such as the Internet, for example via one or more servers. Communication component 432 may provide the content, and may also provide the messages to be displayed in either mode.

Storage device 416 may comprise or be loaded with display component 436 adapted for displaying the messages in the required manner, in accordance with the device being in attentive or inattentive state. For example, when in attentive state, the message may be faded so as to remain visible but not interrupt the user from consuming or creating content, while in inattentive mode the content may be hidden or otherwise concealed.

Yet another component which may be loaded to storage device 416 is data and control flow component 440 for managing the flow of information and control between other components, for example in response to determining by state assessment component 428 that the user is attentive, sending corresponding instructions to display component 436 to display the messages in a faded manner, or if the device state has changed from attentive to inattentive to make the message display more boldly, change thresholds in association with parameters such as user parameter, content parameters, or the like.

In some embodiments, mobile device 400 may communicate with a server computing platform 444 through any communication channel, such as but not limited to the Internet. Server 400 may execute one or more applications related to the apparatus. For example, server 444 may gather data from one or more mobile devices for assessing the efficiency, effectiveness, or other parameters of the used algorithms and optionally improving them, changing thresholds or the like. In some embodiments, some of the components, such as threshold situation assessment component 422, assessment component 424, or state assessment component 428 may be stored and/or executed on server 444 rather than on the mobile device. Such components may receive data, readings or measurements from mobile device 400 through the communication channel, may perform the required computations, and may return the results to mobile device 400.

It will be appreciated that the disclosed components are exemplary only, and refer only to message display. Like any mobile device, mobile device 400 may comprise additional components to support any other functionality, such as power supply circuits, drivers, applications and others.

It will be appreciated that the method and apparatus may also be implemented by determining attentiveness level of the user based on user's looking direction, the user's eye movements, or the like, as may be captured by a camera. When it is determined that the user is attentive, for example by determining that the user is staring at the device with relatively little motion, then a message may be displayed in a faded or otherwise unobstructed manner, while if the user is inattentive the message may be displayed obstructively.

It will also be appreciated that responsive to the user losing or regaining attention to the device, the message may be displayed in a different manner than before, wherein the different manner may not necessarily relate to fading or bolding the message. For example, the message may be rotated at a predetermined angle; the message may be animated as if it is vibrating; the message may be displayed with a different color, optionally using a darker color when the user is inattentive and a lighter color when the user is attentive; adding an element such as a bright area or stripe of varying dimensions over the message, the message may be resized: optionally displaying with a larger size when the user is inattentive and a smaller size when the user is attentive. It will be appreciated that the above manners are exemplary only and that other manner changes may be applied as well.

In some embodiments, the message may be displayed in a gradually changing manner, for example the message may be gradually moved, rotated or resized, or the like. In some embodiments, the message may be animated, for example by displaying moving or changing elements.

Introducing changes to the display manner of a message when the user loses or regains attention provides for using generally available messages such as existing banners, and do not require specially designed messages, thus enabling for fast and easy deployment of the method and apparatus. Changing the appearance of a banner between attentive and inattentive state may be done by changing its color, transparency, size, or location, adding an element such as a stripe or another element moving along the stripe, or the like.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the parts of the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk. C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, wherein the computerized device displays content, comprising:
   receiving a reading from a sensor associated with a mobile computing device used by a user;
   determining whether the user and the mobile computing device are in a moving environment;
   determining a type of vehicle the user and the mobile computing device are in;
   determining the threshold based on the type of vehicle;
   determining based on the reading whether the device is in movement exceeding a threshold;
   responsive to the movement exceeding the threshold, displaying a message in a first obstructing manner, whereby the content is obstructed, at least partially, by the message; and
   responsive to the movement not exceeding the threshold, displaying the message in a second manner,
   whereby in the second manner the content is less obstructed than in the first obstructing manner.

2. The computer-implemented method of claim 1 whereby the content is obstructed, at least partially, by the message displayed in the second manner.

3. The computer-implemented method of claim 2, wherein when the reading indicates increasing motion, the message is displayed more boldly and the content is displayed in a more obstructed manner.

4. The computer-implemented method of claim 3, wherein the message is abruptly displayed in a more prominent manner and the content is abruptly displayed in a more obstructed manner.

5. The computer-implemented method of claim 2, wherein when the reading indicates decreasing motion, the message is displayed less boldly and the content is displayed in a less disrupted manner.

6. The computer-implemented method of claim 5 wherein the message is displayed less boldly and the content is displayed in a less obstructed manner after a predetermined delay.

7. The computer-implemented method of claim 6, wherein the message is gradually faded out and the content is gradually displayed in a less obstructed manner.

8. The computer-implemented method of claim 1, wherein the threshold is determined in accordance with a situation of the user.

9. The computer-implemented method of claim 1, further comprising determining a position of the user.

10. The computer-implemented method of claim 9 wherein the position is selected from the group consisting of: walking, standing, sitting and lying.

11. The computer-implemented method of claim 1 further comprising:
    determining a situation of the user; and
    determining the threshold based on the situation.

12. The computer-implemented method of claim 1, further comprising:
    responsive to the movement exceeding the threshold, determining based on the reading whether the movement is due to the device and the user being in a moving vehicle; and
    responsive to determining that the device and the user are in a moving vehicle, displaying the message such that content displayed on the device is obstructed less than when the movement exceeds the threshold.

13. The computer-implemented method of claim 1, wherein the movement not exceeding the threshold or the movement indicating that user and the device are in a moving vehicle, is associated with the user being attentive to the device, and the movement exceeding the threshold and not associated with a moving vehicle is associated with the user being inattentive to the device.

14. The computer-implemented method of claim 1, wherein the message is displayed with a graphic aspect corresponding to the content displayed on the device.

15. The computer-implemented method of claim 1, wherein the message is displayed with a shadow surrounding figures or letters.

16. The computer-implemented method of claim 1, wherein a difference between the first manner and the second manner relates to at least one factor selected from the list consisting of: boldness, location; rotation angle; vibration; color; size; animation; addition of a moving element, addition of a moving element to a banner; and adding an element.

17. The computer-implemented method of claim 1, wherein transition between the first manner and the second manner is gradual.

18. An apparatus comprising a mobile device having a processing unit and a storage device, the apparatus comprising:
a sensor for providing movement indication of the mobile device;
a sensor communication component for receiving a reading from the sensor;
a situation determination component for determining whether the user and the mobile computing device are in a moving environment;
a vehicle type determination component for determining based on one or more readings in which vehicle type the mobile device and a user thereof are;
a threshold assessment component for determining a threshold based on the vehicle type;
a movement assessment component for determining based on the reading whether the mobile device is in movement exceeding the threshold; and
a display component for (i) displaying a message in a first obstructing manner responsive to the mobile device being in movement exceeding a threshold, whereby content displayed on a display device associated with the mobile device is obstructed at least partially, by the message, and (ii) displaying the message in a second manner, responsive to the movement being below the threshold,
whereby in the second manner the content is less obstructed than in the first obstructing manner.

19. The apparatus of claim 18 whereby the content is obstructed, at least partially, by the message displayed in the second manner.

20. The apparatus of claim 19, wherein when the reading indicates increasing movements, the message is displayed more boldly and the content is displayed in a more obstructed manner.

21. The apparatus of claim 20, wherein the message is abruptly displayed more boldly and the content is displayed abruptly in a more disrupted manner.

22. The apparatus of claim 19, wherein when the reading indicates decreasing movements, the message is displayed less boldly and the content is displayed in a less disrupted manner.

23. The apparatus of claim 22 wherein the message is displayed less boldly and the content is displayed in a less disrupted manner only after a predetermined delay.

24. The apparatus of claim 23, wherein the message is gradually faded out and the content is gradually displayed in a less disrupted manner.

25. The apparatus of claim 18, further comprising a state assessment component for determining attention level of a user using the mobile device based on output of the movement assessment component.

26. The apparatus of claim 18, wherein the movement not exceeding the threshold or the movement indicating that user and the mobile device are in a moving vehicle is associated with the user being attentive to the mobile device, and the movement exceeding the threshold and not associated with a moving vehicle is associated with the user being inattentive to the mobile device.

27. The apparatus of claim 18, wherein a difference between the first manner and the second manner relates to at least one factor selected from the list consisting of: boldness; location; rotation angle; vibration; color; size; animation; addition of a moving element, addition of a moving element to a banner; and adding an element.

28. The apparatus of claim 18, further comprising a server computing platform for receiving a reading from the mobile device, analyzing the reading and returning a result to the mobile device.

29. A computer-implemented method performed by a computerized device, comprising:
receiving a reading from a sensor associated with a mobile computing device used by a user;
determining based on the reading whether the device is in movement exceeding a threshold or the movement indicating that user and the device are in a moving vehicle, and thus whether the user is attentive to the device;
responsive to the movement exceeding the threshold and not associated with a moving vehicle, and to the user being inattentive to the device, displaying a message in a first obstructing manner, whereby content displayed on a display device associated with the mobile device is obstructed, at least partially, by the message; and
responsive to the movement not exceeding the threshold and to the user being attentive to the device, displaying the message in a second manner,
whereby in the second manner the content is less obstructed than in the first obstructing manner.

30. The computer-implemented method of claim 29, wherein whether the user is attentive to the device is determined in accordance with the user's looking direction and eye movements.

31. A computer program product comprising:
a non-transitory computer readable medium;
a first program instruction for receiving a reading from a sensor associated with a mobile computing device used by a user;
a second program instruction for determining whether the user and the mobile computing device are in a moving environment;
a third program instruction for determining a type of vehicle the user and the mobile computing device are in;
a fourth program instruction for determining the threshold based on the type of vehicle;
a fifth program instruction for determining based on the reading whether the device is in movement exceeding a threshold;
a sixth program instruction for responsive to the movement exceeding the threshold, displaying a message in a first obstructing manner, whereby content displayed on a display device associated with the mobile device is obstructed, at least partially, by the message; and
a seventh program instruction for responsive to the movement not exceeding the threshold, displaying the message in a second manner,
whereby in the second manner the content is less obstructed than in the first obstructing manner, and wherein said first, second, third, fourth, fifth, sixth and seventh program instructions are stored on said non-transitory computer readable medium.

\* \* \* \* \*